Oct. 7, 1947.  H. J. PETERSON  2,428,721
ANIMAL TRAP
Filed March 26, 1945  2 Sheets-Sheet 1
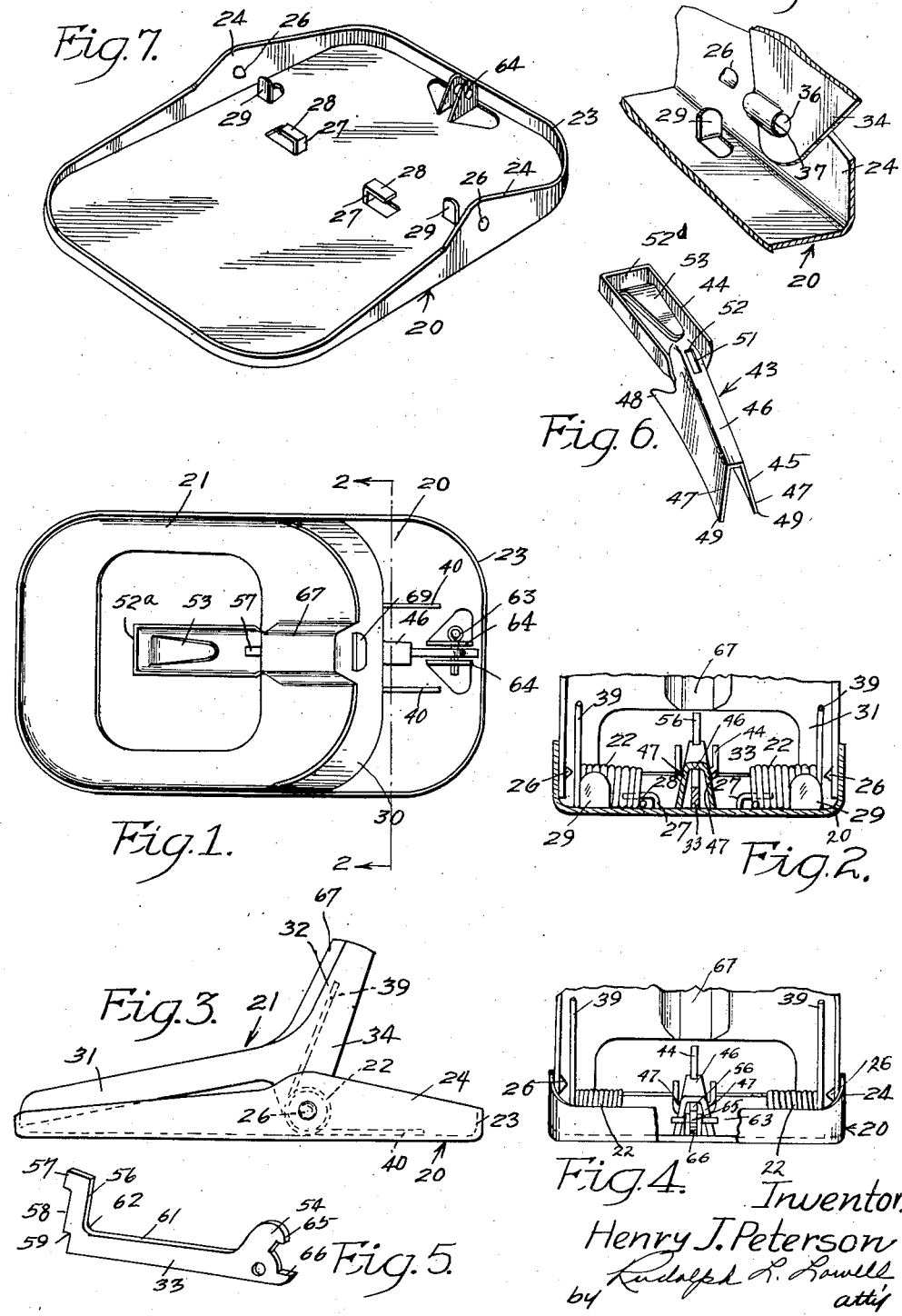
Inventor.
Henry J. Peterson
by Rudolph L. Lowell
atty

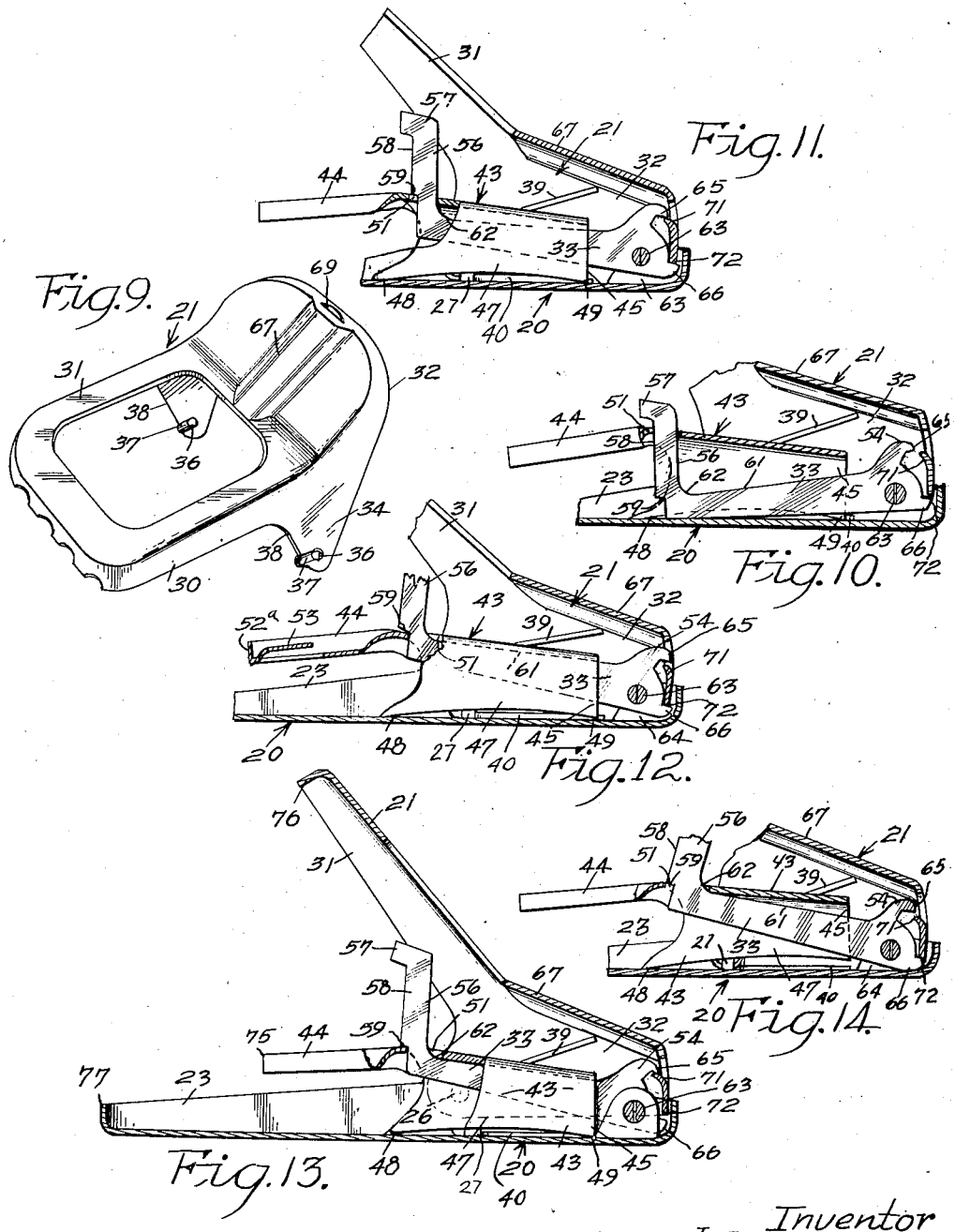

Patented Oct. 7, 1947

2,428,721

UNITED STATES PATENT OFFICE 2,428,721

ANIMAL TRAP

Henry J. Peterson, Webster City, Iowa

Application March 26, 1945, Serial No. 584,885

6 Claims. (Cl. 43—83.5)

This invention relates generally to animal traps and in particular to a self-setting trap for catching rats and mice.

Traps generally used for catching rats and mice are designed to provide for a sensitive or ready release of the spring actuated jaw to an animal catching or capturing position. In many of these traps, however, care must be exercised in their setting to prevent a finger being caught in the trap by an accidental springing of the trap or on a failure of the trap to be set when the jaw has been moved to a set position. Further the sensitive release of the spring jaw is usually accomplished at a sacrifice in the safe setting of the trap so that oftentimes a trap is sprung while being carried to its place of ultimate use, or on a slight jarring of the trap as it is placed on a floor surface.

Another objection to traps of this type now in common use is found in the fact that the spring actuated jaw is movable through an angle of 90° or more from a latched position to a sprung position. Along with this set position of the jaw the bait member is generally positioned relatively close to the forward end and sides of the trap. As a result when a mouse is warned of impending danger, by the release of the jaw member, the time element required for the jaw to move from a set to a closed position is usually sufficient to permit the mouse being out of the trap by the time the trap is sprung. In other words with the bait being near an end of the trap only a relatively small distance must be covered by the mouse to move out of the trap. This condition is evidenced by the fact that many times a mouse is caught near the end of its nose, by a front foot, or other small portion of its body. When a mouse is thus caught there is unnecessary bleeding about the trap or the mouse must be killed before it can be disposed of.

It is an object of this invention, therefore, to provide an improved animal trap.

Another object of this invention is to provide an animal trap in which a spring-actuated pivoted jaw is self-set on its movement into a set position and releasably but positively held against premature or accidental release.

A further object of this invention is to provide an animal trap having a pivoted jaw movable through a complete angular distance of substantially 45°, and the bait held at a position spaced from and substantially below the forward end of the jaw, when the jaw is in a set position. A mouse, therefore, must get well within the trap to reach the bait while the time required for the jaw to close is appreciably reduced.

A still further object of this invention is to provide an all metal animal trap which is compact, comprised of a relatively small number of parts having wide manufacturing tolerances, with such parts being capable of assembly without the use of tools or jigs, and relatively constructed to provide for their detachable assembly without requiring separate connecting pins or the like.

Yet another object of this invention is to provide an animal trap having a spring-actuated jaw in which the pivot for the jaw, and the supports for the jaw springs are formed as an integral part of the trap base member.

A feature of this invention is found in the provision of an animal trap having a bait member resting on the trap base and relatively assembled with a pivoted trigger in a lost motion connection such that the bait member and trigger are releasably locked, at an upper pivotally moved position of the trigger, to lock the jaw in a set position. The trigger is moved to a jaw latching position concurrently with the movement of the jaw to a set position.

A further feature of this invention is found in the provision of an animal trap in which a spring-actuated pivoted jaw is provided with a pair of oppositely arranged openings in its side portions adapted to be releasably engaged with inwardly extended pivots integrally formed with the base member, whereby to pivotally support the jaw on the base member.

A still further feature of this invention is found in the provision of an animal trap having a pair of oppositely arranged coil springs for actuating a pivoted jaw, in which the springs merely rest on the top surface of the trap base member and are held against movement relative to the base by means formed integrally with the base.

Further objects, features and advantages of this invention will become apparent from the following description when taken in connection with the accompanying drawings in which:

Fig. 1 is a plan view of the animal trap of this invention with its jaw in a closed position;

Fig. 2 is a transverse sectional view taken on the line 2—2 of Fig. 1;

Fig. 3 is a side elevational view of the trap;

Fig. 4 is a rear elevational view of the trap;

Fig. 5 is a perspective view of the trigger member forming part of the jaw latching or trigger mechanism;

Fig. 6 is a perspective view of a bait member adapted for relative assembly with the trigger member in Fig. 5 to releasably latch the jaw in a set position;

Fig. 7 is a perspective view of the base member;

Fig. 8 is a fragmentary perspective detail view showing the pivoted jaw in a position for assembly with the base member;

Fig. 9 is a perspective view of the jaw member;

Fig. 10 is a fragmentary enlarged sectional view showing the relative positions of the trigger and bait members with the jaw, when the jaw is approaching a set position and about to engage the trigger member;

Fig. 11 is illustrated similarly to Fig. 10 and shows the relative positions of the trigger and bait member when the jaw is engaged with the trigger and its movement continued toward a set position;

Fig. 12 is illustrated similarly to Fig. 1 and shows the position of the jaw when the trigger and bait member are in releasable engagement;

Fig. 13 is illustrated similarly to Fig. 12 and shows the jaw in a set position with the trigger and bait member releasably engaged; and Fig. 14 is illustrated similarly to Fig. 13 and shows the relative positions of the jaw, trigger and bait member providing for the release of the jaw to a sprung or closed position.

Referring to the drawings the animal trap of this invention is shown in Figs. 1 and 2 as including a base member 20, a pivoted jaw 21 and a pair of oppositely arranged coil springs 22 for actuating the jaw.

The base 20 (Fig. 7) is formed of a sheet metal material and includes an upright peripheral rim 23 having oppositely arranged raised side portions 24. Each side portion 24 is integrally formed with an inwardly extended punched-out bead 26, which bead constitutes a pivot for the jaw 21. Substantially in the transverse plane of the oppositely arranged pivots 26 and inwardly of such pivots, the base 20 is integrally formed with a pair of transversely spaced upright members 27 having oppositely extended lateral projections 28 at their upper ends for a purpose which will appear hereinafter. Located rearwardly of the uprights 27 are a second pair of uprights 29, punched out of the base member 20, and arranged in a transversely spaced relation so that an upright 29 is located between a side portion 24 and an upright 27.

The jaw 21 is also formed of a sheet metal material and as best appears in Figs. 3 and 9 is of a substantially L-shape in longitudinal cross section with the long leg 31 constituting the closing portion or body member of the jaw, and the short leg 32 constituting a lever adapted to operatively engage and move a trigger member 33 to a position for releasably holding the jaw in a set position, as will be later explained. A downwardly extended peripheral rim or flange 30 is formed at the junction of the jaw portions 31 and 32 with a pair of raised side portions or legs 34 having oppositely arranged openings 36 adapted to receive the pivots 26 on the base member 20. An opening 36 is associated with a grooved or indented guide-way 37 for slidably receiving a pivot 26, each of which guide-ways 37 is open at one end to the forward edge 38 of a jaw leg 34 and at its opposite or rear end to its corresponding opening 36.

In the assembly of the jaw 21 with the base 20 (Fig. 8) the jaw legs 34 are positioned rearwardly of the pivots 26 with the forward ends of the guide-ways 37 in positions to slidably receive the pivots 26. The jaw in this position is moved forwardly relative to the base 20 whereby the pivots 26 are guided in the guide-ways 37 to the openings 36 in the jaw legs 34. With the pivots 26 received within the openings 36 the jaw 21 is pivotally supported for pivotal movement on the base 20, and is removable from the base only on reversal of the above steps providing for its assembly with the base.

The springs 22 are of a usual coil type integrally formed at their opposite ends with lateral extensions 39 and 40 which are of a substantially equal length so that the springs are interchangeable, and reversible, without in any way affecting their assembly in the trap or their operation in actuating the jaw 21. Since the construction and assembly of the springs 22 are the same only one thereof will be referred to in the following detail description.

In the assembly of a spring 22 within the trap the lower side 41 of the spring rests on the base member 20 (Figs. 2 and 3) with its lower side 41 and the lateral extension 40 resting on the base. The lateral projection 28 of an upright member 27 is inserted within the inner end 42 of the spring, which inner end defines the end having the lateral extension 40. The rear side of the spring is in bearing engagement against an upright member 29 while the lateral extension 39, at the outer end of the spring 22, is in bearing engagement with the bottom side of the jaw portion 32. It is seen, therefore, that a spring 22 is in bearing engagement with the base 20 and the jaw 21 through the lateral extensions 40 and 39, respectively, while a pair of adjacent upright members 28 and 29 retain the spring against movement relative to the base member.

By virtue of the construction of the base 20 and its relative assembly with the springs 22 and jaw 21, pins now generally used in commercial traps for pivotally supporting the jaw and supporting the springs for actuating the jaw, are entirely eliminated while providing for a compact and positive assembly of the jaw and springs with the base. In the assembly of the trap of this invention the springs 22 are usually assembled with the uprights 28 and 29 prior to the assembly of the jaw 21 with the base 20. Since these parts are assembled by the relative positioning of coacting portions thereof no tools are required for inserting and then locking pivot pins or the like.

The jaw 21 is self setting and then releasably held in a set position by the provision of a trigger or latch mechanism including the trigger member 33 and a bait member 43. The bait member 43 (Figs. 6 and 11) is integrally formed with a forward bait holding portion 44 and a supporting or rear portion 45. As best appears in Fig. 6 the rear portion 45 is of a substantially inverted U-shape in cross section and comprises a top side 46 and side members 47. The lower edges of the side portions 47 are curved concavely upwardly, as shown in Fig. 11, to provide for the support of the bait member 43 on the base member 20 only at the front ends 48 and the rear ends 49 of the side members 47. In other words the ends 48 and 49 constitute transversely spaced supports at each end of the rear portion 45 of the bait member adapted to rest on the top surface of the base 20, with the front ends 48 defining a fulcrum on which the bait member 43 is pivotally movable relative to the base 20 for a purpose which will appear later.

A slot or opening 51 is formed adjacent the forward end of the top side 46 at a position such that its front end 52 is located rearwardly of the front ends 48 of the side members 47. The bait-holding portion 44 of the bait member 43 is extended downwardly and forwardly from the top side 46 and is integrally formed on three sides with an upright flange 52a and in its top side with an upwardly punched-out lug 53 to provide for the holding of either a meat or a cheese bait.

The trigger member 33 is of a flat metal construction and includes a body member having an enlarged rear end 54 and an upright projection or member 56 at its forward end (Fig. 5). The upright projection 56 is integrally formed at its upper end with a forward extension 57 comprising a hook adapted to be inserted within the opening 51 of the bait member 43 to provide for an interlocked but relatively movable assembly of the trigger member 33 and the bait member 43. The forward edge 58 of the upright projection 56 is provided adjacent its lower end with an undercut shoulder 59 which is located substantially in the plane of the upper edge 61 of the trigger body member. The rear edge of the projection 56 is joined with the top edge 61 of the trigger body member by a concavely formed arcuate cam surface 62 which is located substantially oppositely from the undercut shoulder 59.

In the assembly of the trigger 33 with the bait member 43 the extension 57 of the trigger is hooked within the opening 51 in the bait member so that the projection 56 is slidable within the opening and the side members 47 are in a straddling relation with the trigger body member as shown in Fig. 10. The members 33 and 43 are thus slidably connected in a lost motion connection and are disconnected only on the unhooking of the extension 57 from the opening 51. The rear end 54 of the trigger 33 projects rearwardly from the bait member 43 and is pivotally supported on the base 20 on a pin 63 (Figs. 1 and 7) carried in a pair of upright members 64 which are punched out of the base 20. This pivotal connection of the trigger with the base 20 constitutes the only positive connection of the trigger mechanism with the base.

The trigger end 54 is formed with a pair of rearwardly extended angularly spaced projections 65 and 66 adapted for coacting engagement with the rear end of the jaw 21 to provide for a self-setting of the jaw. Thus as shown in Figs. 1 and 9 the rear portion 32 of the jaw 21 is formed with a longitudinally extended upright hollow rib 67 having a rear side coincident with the rear side of the jaw rim 30. A punched-out portion 69 at the rib 67 and in the rim 30 provides a forwardly extended engaging member 71 located in a spaced relation upwardly from the lower rear edge 72 of the rim 30 (Fig. 11).

In the operation of the trigger mechanism of this invention let it be assumed that the jaw 21 is in its sprung or closed position shown in Fig. 3. The released position of the trigger mechanism, when the jaw 21 is in its sprung position, is illustrated in Fig. 10. At this released position the bait member 43 of the trigger mechanism merely rests on the base 20 through the supports 48 and 49, while the trigger 33 is loosely positioned between the side members 47 with its forward end resting upon the base 20.

By placing the finger under the rear end of the base 20 and the thumb on the top side of the jaw rear portion 32 a manual pressure is applied on the jaw to pivotally move the jaw to its set position. The trigger mechanism remains in a released position until the jaw 21 approaches a set position as shown in Fig. 10. On a continued movement of the jaw 21 to a set position its rear edge 72 engages the trigger extension 66 whereby the trigger 33 is pivotally moved in a clockwise direction from its position shown in Fig. 10 to its position shown in Fig. 11. This pivotal movement of the trigger 33 provides for the rear edge of the projection 56 slidably engaging the rear side of the opening 51 to move the bait member 43 on the base 20 in a rearward direction longitudinally of the trigger 33. The rearward movement of the bait member 43 takes place by virtue of the arc of pivotal travel of the upright projection 56. As the cam surface 62 approaches the opening 51 the forward side 52 of the opening 51 approaches a position below the undercut shoulder 59. When the rear side of the opening 51 rides over the cam surface 62 the rearward movement of the bait member is accelerated concurrently with the movement of the front side 52 of the opening 51 to a position below the shoulder 59 as illustrated in Fig. 12.

With the trigger mechanism in its position shown in Fig. 12 the manual pressure applied on the rear portion 32 of the jaw 21 is released against the pressure of the springs 22 acting on the jaw 21, whereby the jaw is moved in a counter-clockwise direction from its position shown in Fig. 12 with the bottom edge 72 against the trigger extension 66, to its position shown in Fig. 13 in which the inward projection 71 is engaged with the under side of the trigger rear extension 65. With the jaw biased in a counter-clockwise direction by the springs 22 this engagement of the trigger extension 65 with the projection 71 acts to pivot the trigger member 33 in a counter-clockwise direction, as also viewed in Fig. 13. The trigger 33, however, is held against pivotal movement in a counter-clockwise direction by the releasable engagement of the shoulder 59 with the front side of the opening 51. As a result the trigger extension 65 is retained in engagement with the jaw projection 71 whereby the jaw is releasably retained in a set position.

The trigger mechanism is actuated to release the jaw 21 to its sprung or closed position shown in Fig. 3, by the pivotal movement of the bait member 43 on the front end supports 48 of the bait member rear portion 45. Thus although the supports 47 and 48 of the bait member 43 normally rest on the base member 20, the front end supports 48 constitute a fulcrum on which the bait member 43 is pivotally movable downwardly and forwardly relative to the base 20. As clearly appears in Fig. 13 the fulcrum 48 is located forwardly of the opening 51, and in turn forwardly of the engaged position of the coacting portions 52 and 59 on the bait member and trigger, respectively. On a downward and forward pivotal movement of the bait member 43 about the fulcrum 48 the forward side 52 of the opening 51 is moved out of an engaging position with the shoulder 59. The trigger 33 is thus free to be moved in a counter-clockwise direction to its normal position shown in Fig. 10. This movement of the trigger 33 in turn moves the extension 65 out of an engaging position with the projection 71 at the rear end of the jaw 21. The jaw is thus released from its set position and actuated by the springs 22 to its sprung or closed position.

Although the movement of the bait member in response to the pivotal movement of the trigger member to an upper position is the result of sliding action of the rear side of the projection 56 with the rear side of the opening 51 it is to be understood that this action takes place when the base member is in a substantially horizontal plane. Thus it has been found that when the base member is tipped forwardly and downwardly at an angle of substantially 10° to 15° from a horizontal plane the action of gravity will retain the bait member 43 from moving rearwardly into an engaged position with the trigger 33. However, when the base member is inclined or in a horizontal plane and the trigger 33 is pivoted by the jaw 21 to an upper pivotally moved position such that the bait member is supported at the opening 51 on the trigger top edge 61 with the fulcrum 48 raised from the base 20, gravity action on the bait member supplements the action of the trigger in moving the bait member rearwardly for engagement of the shoulder 59 with the front side 52 of the opening 51.

It is seen, therefore, that the trap is entirely self setting concurrently with the movement of the jaw 21 to a set position. Although it has been explained that the trigger mechanism is released by the forward and downward pivotal movement of the bait member 43 it is to be understood that its release will also take place when it is moved forwardly on the base 20 relative to the trigger 33. This latter action takes place to release the jaw when a mouse or a rat is merely nibbling at the bait as contrasted to its attempts in trying to dig the bait from the trap.

As clearly appears in Fig. 13 the construction of the jaw 21 and its pivotal support on the base 20 is such that when the jaw is in a set position its forward or closing portion 31 is inclined upwardly and forwardly from the base 20 at an angle of substantially 45°. Further the trigger mechanism is so located on the base member 20 that when the jaw 21 is in a set position the forward end 75 of the bait member 43 is in a spaced relation substantially below the forward end 76 of the jaw 21. This relative arrangement of the jaw 21 and bait member 43 provides for the bait member being located substantially centrally between the closing jaw portion 31 and the coacting jaw portion of the base 20 as clearly appears in Fig. 1. As a result of the location of the bait member 43 well within the trap and the small angular movement of the jaw 21 from a set position to a closed position the time required for the jaw to close is very short while the distance from the bait to the outside of the trap is relatively great. In other words a mouse must be completely within the trap, or at least have a large portion of its body within the trap, before it can reach the bait member 43. As a result the trap operates with a high degree of efficiency due to the fact that the jaw 21 closes before the animal has a chance to get out of the trap.

In one embodiment of the invention the base member is about 2⅜ inches long and 1½ inches wide, with the forward end of the bait member 43 being about three-quarters of an inch inwardly from the front end 77 of the base. In this embodiment the jaw opening, that is the distance between the forward end 76 of the jaw and the base 20, is about 1⅜ inches. It is seen, therefore, that the bait member 43 is approximately three-quarters of an inch inwardly from the forward end 77 and the sides of the base member 20, as compared to only a 1¼ inch closing pivotal movement of the jaw 21. As a result the mouse must move at almost the speed of the jaw 21 to escape being caught.

From a consideration of the above description it is seen that the invention provides an automatically self-setting trap which is comprised of a minimum number of parts constructed so as to be relatively assembled without the use of extra pivot pins and the like, and which parts are capable of being assembled in a small and compact trap of high operating efficiency. The trigger mechanism is comprised of but two parts, the bait member 43 and the trigger member 33, which are interlocked against separation by a lost motion connection and with the mechanism positively connected with the base 20 through only a single cotter key 63. The cotter key 63 is thus the only extra or separate connecting element used in the entire trap.

Although the invention has been described with respect to a preferred embodiment thereof, it is to be understood that it is not to be so limited since changes and modifications can be made therein which are within the full intended scope of this invention as defined by the appended claims.

I claim:

1. In an animal trap comprising a base and a spring-actuated pivoted jaw, means for releasably locking said jaw in a set position including a bait holder having a rear portion formed with a top side and downwardly extended side portions, with the front and rear ends of the lower edges of said side portions being adapted to rest on said base member, and said top side having an opening adjacent the forward end thereof, a trigger pivotally supported at its rear end on said base member and movably received between said side portions, said trigger being formed with an upright member at the front end thereof movable within said opening, said upright member having an undercut shoulder in the front edge thereof releasably engageable with said bait member at the forward side of said opening, a cam surface formed in the rear edge of said upright member operatively engageable with the rear side of said opening to move said shoulder into releasable engagement with the bait holder at said opening on upward pivotal movement of said trigger, and coacting means on said jaw and on said trigger adapted to provide for an upward pivotal movement of said trigger, as said jaw is moved to a set position, and to releasably latch said jaw with said trigger.

2. An animal trap comprising a base member and a spring-actuated pivoted jaw, means for releasably locking said jaw in a set position comprising a trigger pivotally supported at its rear end on said base member and formed with an upright member at the forward end thereof, a bait member formed with a rear portion having a top side and a pair of downwardly extended spaced supports at each end thereof adapted to rest on said base member, with said top side having an opening therein located rearwardly of the front pair of said supports, said upright member being movable within said opening on pivotal movement of said trigger, coacting portions on said bait member and on said upright member adapted to be releasably engaged on pivotal movement of the trigger to an upper position, and coacting means on said jaw and on the rear end of said trigger adapted to provide for an upward pivotal movement of the trigger, as said jaw is moved to a set position, and to latch the jaw in a set position with said trigger.

3. An animal trap comprising a base member and a spring-actuated pivoted jaw, means for releasably holding said jaw in a set position including a bait holder having a rear portion with a top side, a pair of transversely spaced supporting portions at each end of said top side adapted to rest on said base member, a trigger movable between said spaced supports and pivotally supported at its rear end on said base member, said trigger being formed with a body member having an upright member at the front end thereof and said top side having an opening therein located rearwardly of the front pair of said supports adapted to slidably receive said upright member therein, said upright member being formed with an undercut shoulder in its front edge adjacent the lower end thereof adapted to releasably engage said bait holder at the front side of said opening, a cam surface defining the junction of the rear edge of said upright member with the top edge of said trigger body member and located substantially opposite said shoulder, said cam surface, on pivotal movement of said trigger to an upper position, providing for a rearward movement of said bait holder to position the front side of said opening beneath said shoulder, and coacting means on said jaw and on the rear end of said trigger member adapted to provide for an upward pivotal movement of the trigger, as said jaw is moved to a set position, and to latch said jaw in a set position with said trigger.

4. An animal trap comprising a base member and a spring-actuated pivoted jaw, means for releasably holding said jaw in a set position including a trigger pivotally supported at its rear end on said base member, a pivoted bait holder formed with a rear portion having a pair of transversely spaced supports adapted to rest on said base member, with the forward ends of said supports constituting a fulcrum for said bait holder, and said supports being arranged in a straddling relation with said trigger, means connecting said trigger with said bait holder for pivotal movement of said trigger between said supports to an upper position, coacting portions on said trigger and bait holder movable into engagement on an upward pivotal movement of said trigger to releasably hold the trigger in an upwardly pivotally moved position and releasable on a pivotal movement of said bait holder on said fulcrum, and coacting means on said jaw and on the rear end of said trigger member adapted to provide for an upward pivotal movement of the trigger, as said jaw is moved to a set position, and to latch said jaw in a set position with said trigger.

5. An animal trap including a base and a spring-actuated pivoted jaw, means for releasably holding the jaw in a set position including a pivoted bait member having a rear portion adapted to rest on said base and a front bait holding portion, said rear portion having a top side and a pair of laterally spaced supports at the front and rear ends of said top side adapted to rest on said base, with said front pair of supports constituting a fulcrum for said bait member, a pivoted trigger member movably positioned between said supports, a lost motion connection between said trigger and bait member providing for the pivotal movement of said trigger relative to said bait holder to an upper position, means on said trigger and on the rear portion of said bait member engageable at said trigger upper position to releasably hold said trigger against downward pivotal movement, with said last mentioned means being releasable on pivotal movement of said bait member on said fulcrum, and coacting means on said jaw and on the rear end of said trigger member adapted to provide for an upward pivotal movement of the trigger, as said jaw is moved to a set position, and to latch said jaw in a set position with said trigger member.

6. In an animal trap, a metal base member integrally formed with a pair of transversely spaced upright members having outwardly extended lateral projections, a second pair of transversely spaced upright members located rearwardly and outwardly of said first pair of upright members, a pivoted jaw pivotally supported on said base member, a pair of coil springs for actuating said jaw, with each of said springs having a corresponding projection extended within one end thereof, and its rear side in bearing engagement against the forward side of a corresponding one of said second pair of uprights, a lateral extension on said one spring end in bearing engagement with the top of said base, and a lateral extension at the opposite end of a spring in bearing engagement with said jaw.

HENRY J. PETERSON.

REFERENCES CITED

The following references are of record in the file of this patent:

UNITED STATES PATENTS

| Number | Name | Date |
| --- | --- | --- |
| 2,174,929 | Slutz | Oct. 3, 1939 |
| 2,068,865 | Neuhausen | Jan. 26, 1937 |
| 2,321,617 | Peterson | June 15, 1943 |